United States Patent
Basso, Jr. et al.

[11] Patent Number: 5,795,524
[45] Date of Patent: Aug. 18, 1998

[54] PROCESS FOR PRODUCING COMPOSITE TUBULAR PARTS

[76] Inventors: Robert J. Basso, Jr., 4810 La Cruz Dr., La Mesa, Calif. 91941; Wayne E. Hogarth, 7091 Stonewood Dr., Huntington Beach, Calif. 92647

[21] Appl. No.: 825,361

[22] Filed: Mar. 28, 1997

Related U.S. Application Data

[60] Provisional application No. 60/014,316 Mar. 29, 1996.

[51] Int. Cl.[6] .................................................. B29C 70/28
[52] U.S. Cl. ............................ 264/221; 156/155; 156/173; 156/175; 264/257; 264/317
[58] Field of Search .................................. 264/314, 317, 264/221, 257, 258; 156/155, 173, 175, 184, 187

[56] References Cited

U.S. PATENT DOCUMENTS

| | | | |
|---|---|---|---|
| 3,518,338 | 6/1970 | Tambussi | 264/317 |
| 3,970,495 | 7/1976 | Ashton et al. | 156/175 |
| 3,974,012 | 8/1976 | Hogarth | 156/161 |
| 4,126,659 | 11/1978 | Blad | 264/317 |
| 5,125,993 | 6/1992 | Principe | 264/317 |
| 5,176,866 | 1/1993 | Tanaka et al. | 264/317 |
| 5,259,901 | 11/1993 | Davis et al. | 156/155 |
| 5,597,630 | 1/1997 | Hogarth et al. | |
| 5,614,143 | 3/1997 | Hager | 264/317 |

*Primary Examiner*—Mathieu D. Vargot
*Attorney, Agent, or Firm*—Lalos & Keegan

[57] ABSTRACT

A mandrel is fitted with a molded sleeve of low-temperature alloy for forming a rigid bulge along the surface of the mandrel. The sleeve is shaped to define the internal surface of the shell at the bulge. After the mandrel has been so modified with the low-temperature alloy sleeve, it is wrapped with composite cloth containing any thermosetting resin. These resins heat to a known temperature, and permanently set when cured at the set temperature. The curing temperature of the prepreg cloth composite material is lower than the melting point of the low temperature alloy. After curing, the temperature in the curing oven is raised above the cure temperature until it reaches the melting point of the low-temperature alloy, and the alloy liquifies and drains out the drain passageways provided in the mandrel without melting the thermoset resin binder in the fiber cloth as well as leaving the bulge formed by the composite cloth in the shell without obstructing the removal of the mandrel. The resulting composite tubular shaft is thus provided with a bulge of increased diameter. The shafts may be tapered on the external surface or they may have a varied internal diameter.

24 Claims, 7 Drawing Sheets

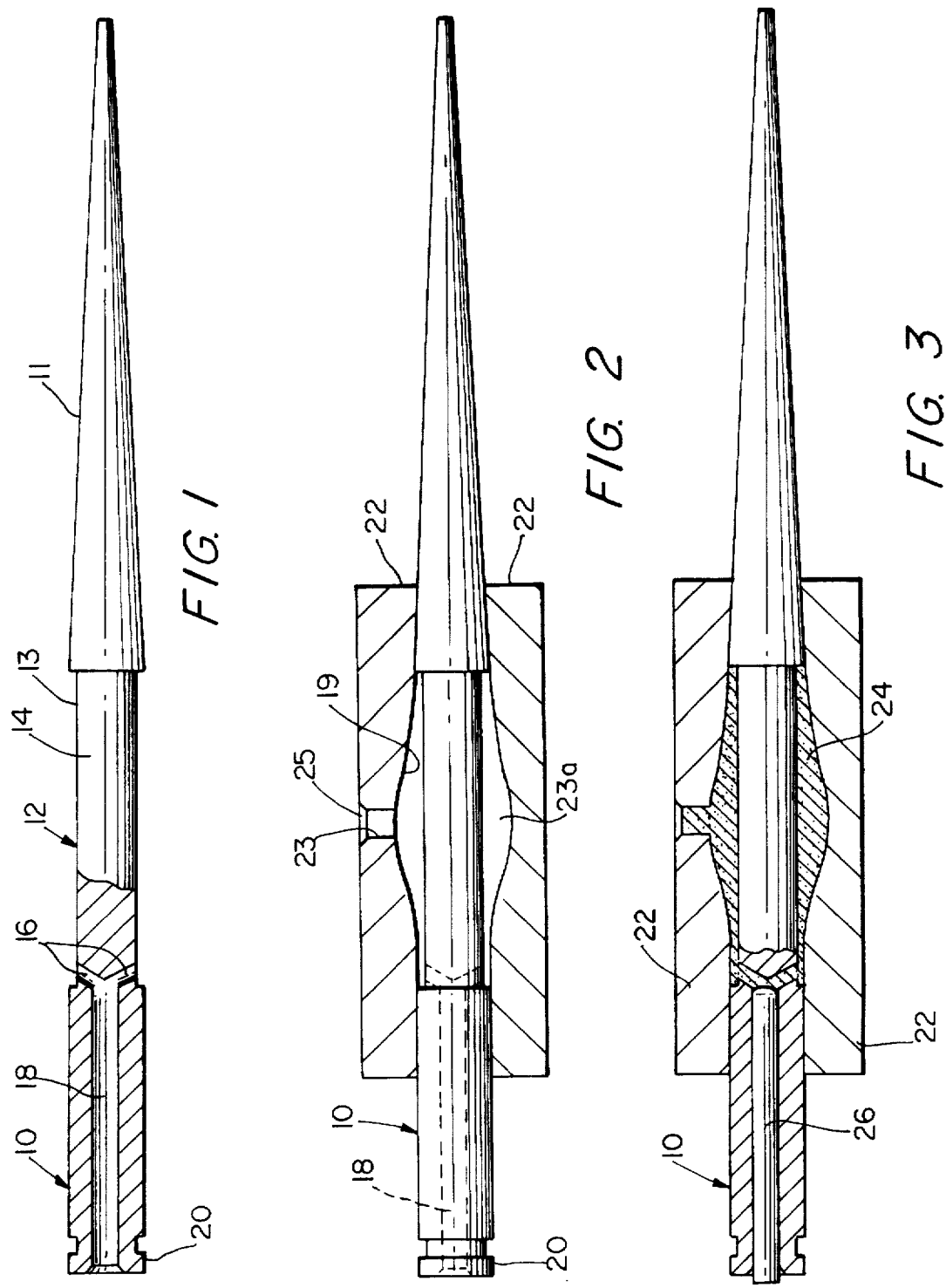

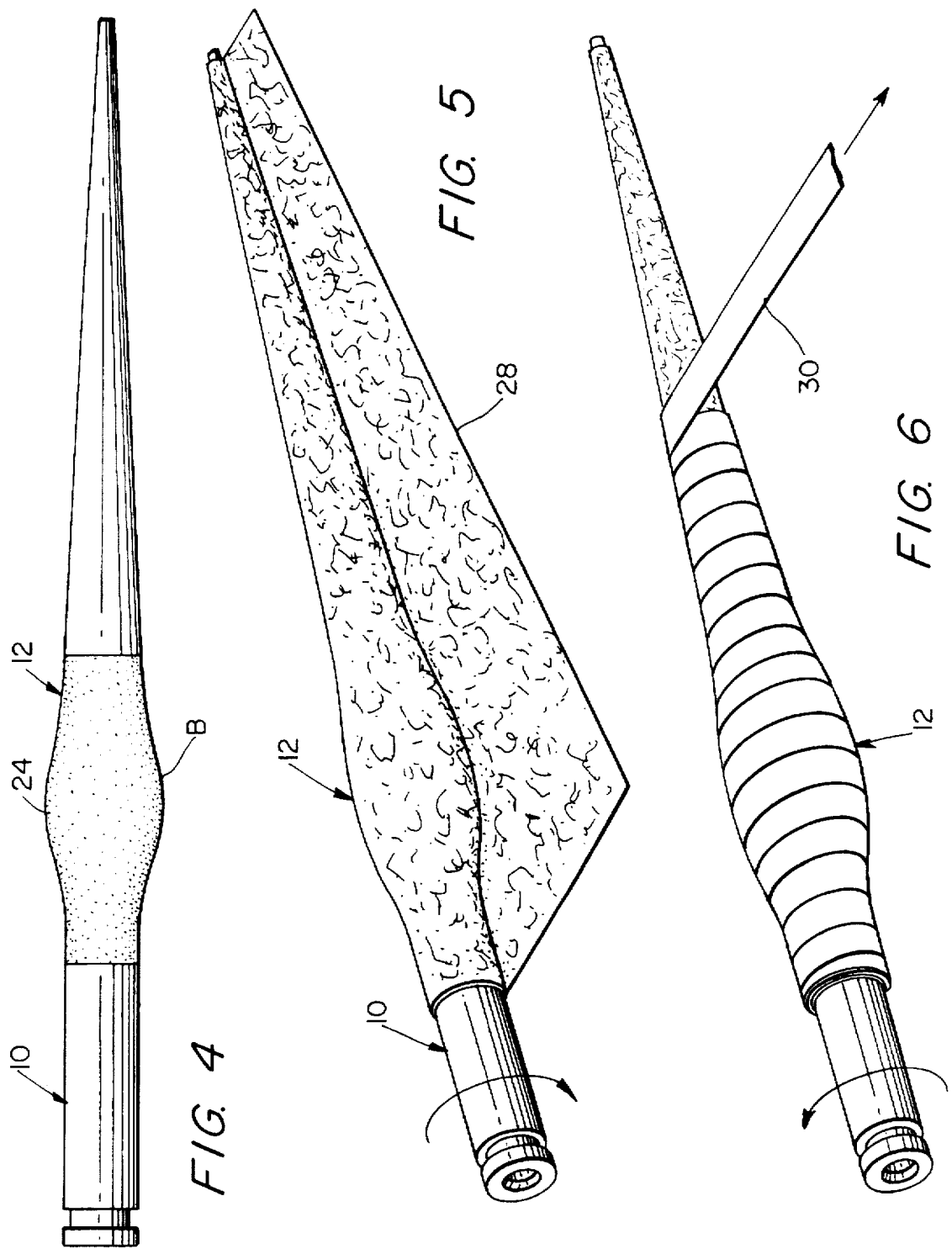

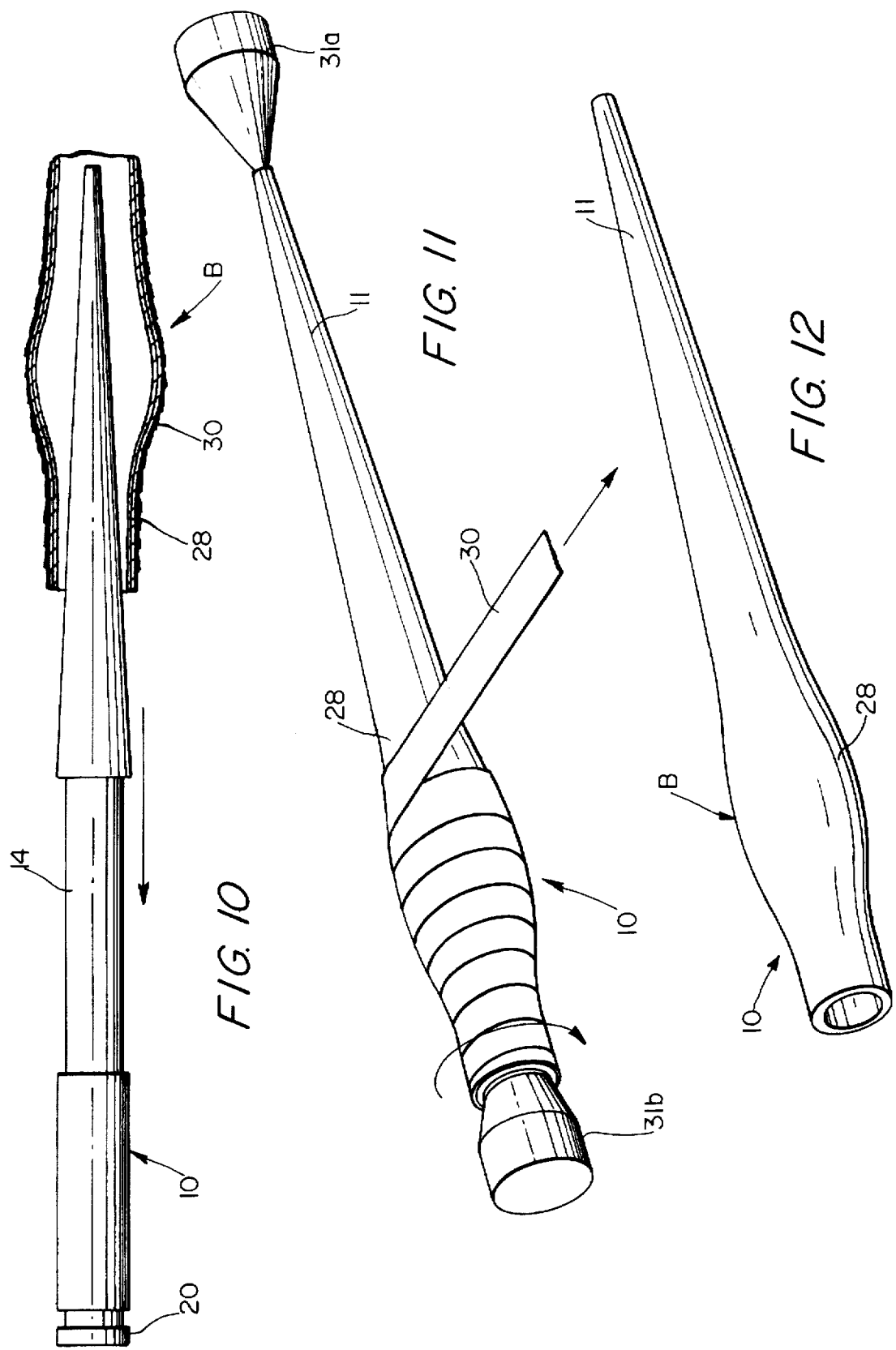

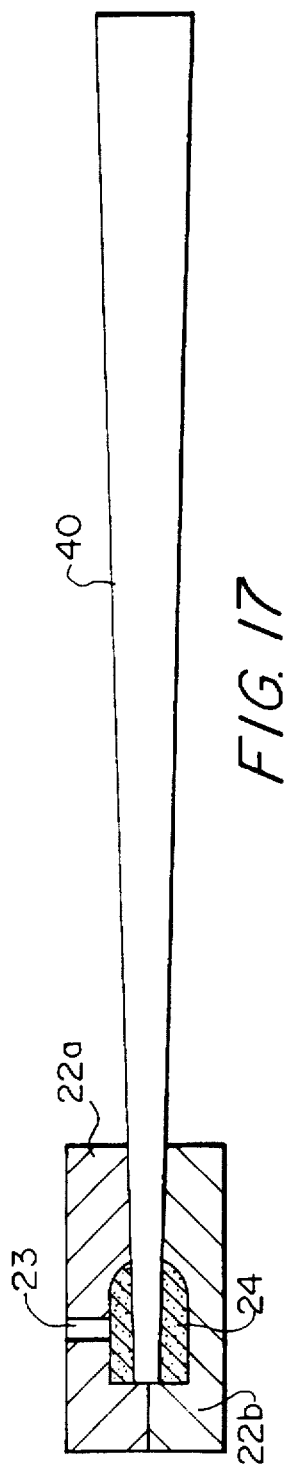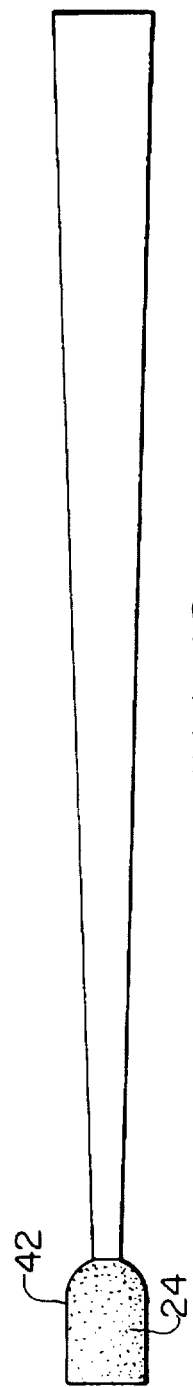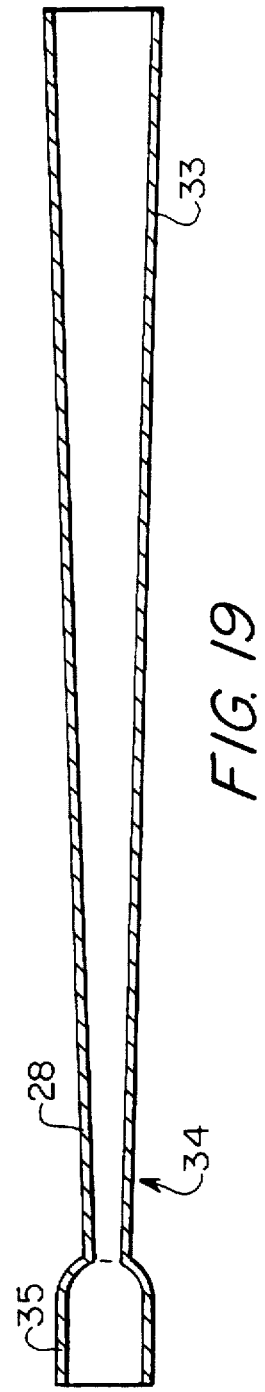

5,795,524

1

PROCESS FOR PRODUCING COMPOSITE TUBULAR PARTS

PRIOR APPLICATION

This application is based on the provisional application entitled PROCESS FOR PRODUCING COMPOSITE TUBULAR PARTS filed Mar. 29, 1996 under Ser. No. 60/014,316, in the names of Robert J. Basso and Wayne E. Hogarth.

BACKGROUND OF THE INVENTION

The invention is in the field of hollow composite tubes that are used in a variety of products, most notably golf club shafts, bicycle frame tube members, and fishing rods. These tubes are typically formed by rolling or winding several layers of resin pre-impregnated carbon fiber ("prepreg") or composite cloth around a mandrel, and heat-curing the wrapped mandrel. A design limitation inherent in this fabrication technique is that the resulting tube must be cylindrical or conical so that the mandrel is removable after the shell has cured. Although these shapes are the basic configurations that are needed, it is often desirable to embellish the basic shapes with a bulge, for forming a handgrip in a fishing rod, for example.

Such bulges have been made without having to abandon the mandrel-winding technique. A special mandrel is used, which has an internal air passageway entering from the end of the mandrel, and which branches out radially, opening to the mandrel surface at a region to be bulged. The mandrel is covered with a form-fitting expandable bladder and then is wound or rolled as usual with the composite or prepreg cloth. A split female mold is clam-shelled around the composite cloth and expandable bladder, thereby defining the shape of the bulge. Air is forced into the passageway at about two hundred pounds per square inch, entering and expanding the bladder and thus the prepreg cloth out against the inner surface of the mold. The prepreg or composite cloth is thus distorted so as to be formed into a larger diameter. The shell is subject to heat to cure the resin while this pressure is held, to produce a smooth bulge. Because air is the only internal forming material extending radially outside the base tube diameter, the mandrel is not obstructed on removal from the resulting hollow composite tube with an enlarged diameter section forming a smooth bulge.

This prior art process is widely used, but is slow and therefore expensive. It creates down time in an otherwise streamlined, rapid fabrication sequence. Air entrapment frequently creates undesirable voids in the composite laminate, which result in structurally inferior products. A corollary to the expense problem is, it creates a bias toward avoiding non-cylindrical or conical forms, leading to the production of less-useful tube shapes.

It is therefore an object of the present invention to provide a faster and much less expensive technique that also expands the capabilities of the producer to create more complex bulge configurations, having greater slopes and more intricate surface contours.

Another object of the present invention is to provide a method and apparatus to use thermoset composites rather than thermoplastics for composite shell fabrication techniques.

SUMMARY OF THE INVENTION

Rather than using air pressure to pump out a blister in the carbon fiber cloth shell as is the current state-of-the-art, a

2 specially designed mandrel is fitted with a molded sleeve of low-temperature alloy for forming the bulge. The sleeve is shaped to define the internal surface of the shell at the bulge. After the mandrel has been so modified with the low-temperature alloy sleeve, it is wrapped with composite cloth containing any thermosetting resin. These resins heat to a known temperature, and permanently set when cured at the set temperature. The curing temperature of the prepreg cloth composite material is lower than the melting point of the low temperature alloy. After curing, the temperature in the curing oven is raised above the cure temperature until it reaches the melting point of the low-temperature alloy sleeve, and the alloy liquifies and drains out the drain passageways provided in the mandrel without melting the thermoset resin binder in the fiber cloth as well as leaving the bulge formed by the composite cloth in the shell without obstructing the removal of the mandrel. The resulting composite tubular shaft is thus provided with a bulge of increased diameter.

THE DRAWINGS

FIG. 1 is a side view of a partial section of the mandrel used to execute the process of the invention.

FIG. 2 is a side view of the mandrel of FIG. 1 with the addition of one-half of a split mold encapsulating the transition section of a mandrel.

FIG. 3 is a side view identical to FIG. 2 illustrating the introduction of the low temperature alloy mold material into the mold cavity.

FIG. 4 is a side elevation view illustrating the finished mandrel with the temporary alloy molded section forming a bulge.

FIG. 5 is a perspective view of the finished mandrel with the uncured pre-impregnated composite material partially rolled onto the mandrel with a conventional rolling machine.

FIG. 6 is a perspective view of the mandrel with the uncured composite shell in place and being wound with shrink tape that is used to compact the composite prepreg material.

FIG. 10 is a side elevation view, partly broken away, of the mandrel being extracted from the composite bulge subsequent to the steps illustrated in FIGS. 7 and 8.

FIG. 11 is a perspective view of the composite part of FIG. 10 and illustrates removal of the shrink wrap tape after curing and removal of the mandrel.

FIG. 12 is a perspective view of the finished tubular composite part with the bulge produced according to the steps illustrated in FIGS. 1-11.

FIG. 17 is a schematic view of the solid case method of producing an expanded or flared end of a tapered golf shaft.

FIG. 18 is a schematic view of the mandrel produced after pour and prior to drainage of the low temperature alloy.

FIG. 19 is a schematic view of a finished golf shaft.

DETAILED DESCRIPTION OF THE PREFERRED EMBODIMENT

Figure 7:
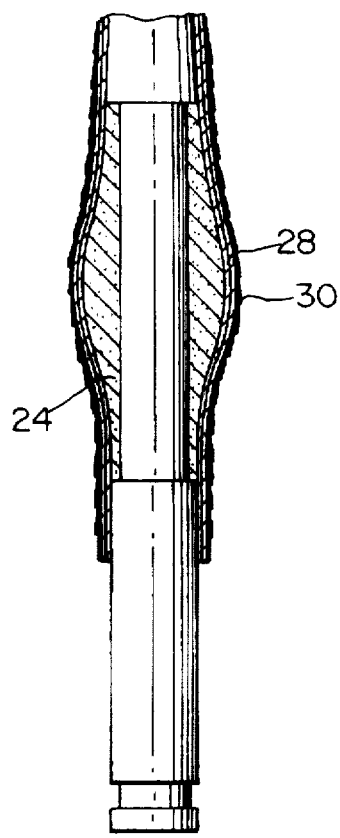
FIG. 7 is an elevational view, partly broken away, of the mandrel of FIG. 6 to illustrate the step of curing in a curing oven.

Turning to the figures, the mandrel shown generally at 10 in FIG. 1, is like a conventional elongated mandrel and may be formed of a metallic material such as aluminum, bronze, steel such as stainless steel and may be machined to a desired configuration that may include a tapered portion 11 and a bulge region 12 with an external surface 13. In the bulge region 12 there is a reduced diameter section 14 that constitutes the location and extent of the proposed bulge B of FIG. 4. This section 14 communicates through connecting passageways 16,16 to a drain passageway 18 that exits the large end 20 of the mandrel. The split mold 22 shown in FIG. 2 has an internal surface 19 configured to the desired external surface of the bulge in the shell. Because of the reduced diameter section 14, there are no sleeve-forming surfaces that converge to a zero thickness, making it difficult to drain. The split mold 22 is conventional except for a critical difference. There is a sprue hole 23 providing fluid communication with the volume 23a of the interior of the split mold 22.

The split mold 22 is clamped onto the mandrel in any convenient fashion, and filled through sprue hole 23 with a liquid moldable material such as the low-temperature alloy 24 as shown in FIG. 3. Passageway 18 may be sealed with a plug 26 that may be the same alloy 24. The low-temperature alloys useful for this invention are any of the low-temperature alloys that melt at a temperature above the curing temperature of the thermosetting resin used for the composite resin impregnated cloth 28. Preferably, the temperature difference should be at least 10° F. and more preferably 20° F. Ideally, the melting point of the low temperature alloy should be greater than about 275° F.

Typical low temperature alloys that may be used include those containing lead, bismuth, tin, antimony, indium, cadmium in any suitable proportions, which are not critical, it being only important that there will be the temperature difference between the melting point of the alloy and the curing or set temperature of the thermosetting resin. It is also possible that a single element such as lead may constitute the "alloy" of the present invention. A specific combination of 40% Bi and 60% Sn having a melting point in the range of 281° F. to 338° F. has been found useful.

Broadly, there may be used any moldable material that is solid at the curing temperature of the thermoset resins to be used and typically liquify at about 300° F. preferably at greater than 320° F. to about 450° F. or even higher or about 20° F. higher than the cure temperature. In this vein, it is possible to use water soluble or other solvent soluble materials that would wash away as a liquid instead of having to be melted to liquify. Among these materials are plaster, "hydrocal" or the like. Such hardened solid materials can be washed out of the cavity 23a and used in place of the low temperature alloys.

The new mandrel is shaped with rigid, solid bulge B of molded material on said external surface 13 as shown in FIG. 4 after removal of the mold 22. The mandrel is then wrapped with the composite "prepreg" cloth 28 as shown in FIG. 5. The prepreg cloth 28 is a combination of the fibers and the resin, universally referred, in the trade as "composite" material, or cloth. Wrapping is done on a rolling machine that is commonly used in the industry. The composite prepreg cloth 28 is formed from a variety of thermosetting resins combined with a matrix of various fiber materials to reinforce the resin.

The thermosetting resins useful alone or in combination for the present invention are selected from a broad list that includes for example: epoxies, such as the diglycidylether from epichlorohydrin and bisphenol A, phenolics, polyesters, alkyds, amino resins, polyurethanes, phenolfurfurals, cellulose acetates, cellulose nitrates, bismyliamide and the like. Typically, these thermosetting resins cure to a hard set when heated within a temperature range of 250° F. to 400° F. for a time of 0.25 to 5.0 hours. The time and temperature will vary with the particular resin.

The fiber materials may be woven, unidirectional or stitched together to reinforce the resin and includes: fiberglass, carbon fibers, aramid fiber (a polyparaphenylenetherephthlate-known commercially as "Kevlar"), boron fibers, polyethylene fibers (known commercially as "Spectra").

These reinforcing fibers forming a matrix may be preimpregnated with the resin prior to being applied to the mandrel or may be impregnated with the resin after the dry fibers have been applied to the mandrel.

It has been found that particular combinations of fiber and resin are more compatible than other combinations. For instance, the epoxy resins bond best to anyone of carbon, boron, aramid and fiberglass fibers. Polyester resins are best used with fiberglass while phenolic resins may be also used with fiberglass when high temperature resistant products are desired.

As has been disclosed in the recently issued patent of one of the present coinventors, U.S. Pat. No. 5,597,630 the composite material may be in the form of a strand of filament, or a sheet forming the cloth as shown at 28. The cloth or sheet 28 or filament is wrapped as disclosed in the above patent over the bulge B.

The wrapped cloth has not yet been cured. It may be heated, if desired, to provide a tackiness, particularly if their filaments are used and are overlapped in multiple layers, temperatures of 80° F. to 120° F. are acceptable for this purpose and to hold its rolled shape on the mandrel. At this point, shrink tape 30 is wrapped over the formed cloth as shown in FIG. 6.

Shrink tapes are old and well known and are used to compact the resin impregnated fiber after the rolling of FIG. 5. The shrink tape should not bond to the resin and therefore it is preferred that different tapes be used for different resins, for example, a polyethylene tape for epoxy resins, nylon for epoxy and polyester resins, cellophane for phenolics and polyesters and polyvinyl fluoride (known commercially as "Tedlar") for any resin.

Figure 9:
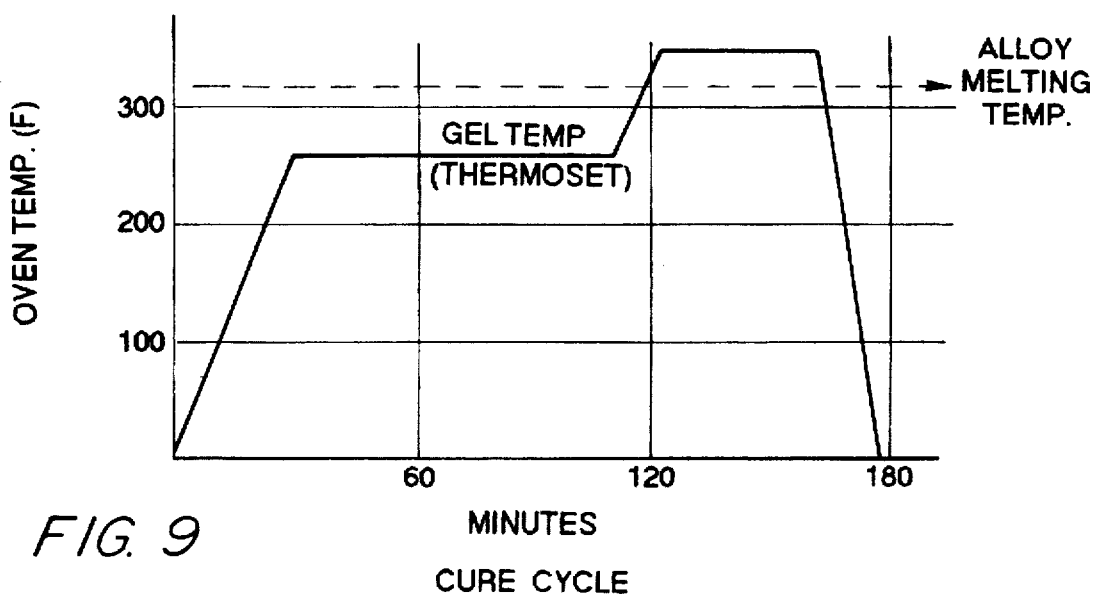
FIG. 9 is a graph of Fahrenheit temperature versus time in minutes, characteristic for curing the resin at one temperature and then draining the metal alloy by raising the temperature to melt the alloy.

The cloth wrapped mandrel is then suspended in a curing oven for a predetermined period of time usually 0.25 hours to 5.0 hours but usually 1.5 hours to 2 hours and at a specific temperature that varies from 200° F. to 350° F. but preferably 250° F. to 275° F., as shown in the graph of FIG. 9. As illustrated in FIG. 7, the resin impregnated cloth 28 is wrapped by the shrink tape 30 and during a period of just under two hours spent in the curing oven at about 260° F., the pre-impregnated thermo-set resin in the cloth 28 cures to a permanent solid state, while the low-temperature alloy sleeve 24 remains solid. The shrink tape 30 remains unaltered.

Figure 8:
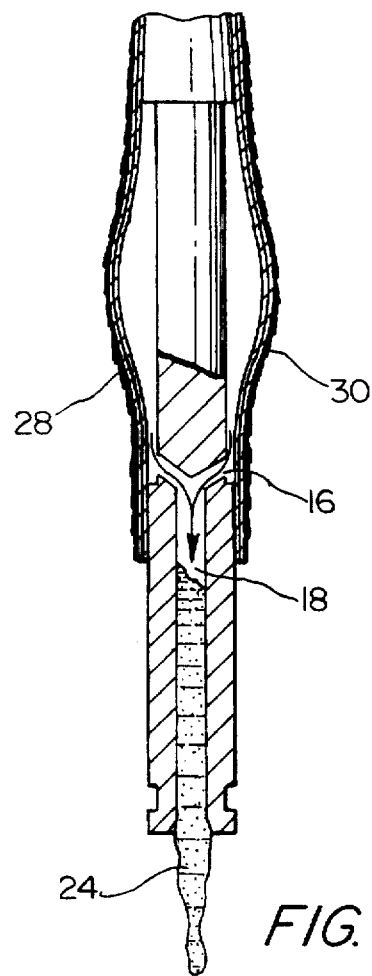
FIG. 8 is a view similar to FIG. 7 illustrating the step of draining the alloy around the mandrel by elevating the temperature above that in FIG. 7.

Subsequent to the curing of the composite cloth into its final, rigid state, the temperature in the oven is again raised, this time to about 350° F. as shown in FIG. 9, which is greater than the approximately 320° F. melting point of the alloy of 40% Bi and 60% Sn causing the alloy 24 to liquify and drain out the drain passageway 18, shown in FIG. 8. This leaves the expanded rigid bulge B composed of the composite cloth 28 and the overwrap shrink tape 30 upon using removable holders 31a and 31b at the ends of the mandrel to permit its rotation, as is conventional. The mandrel is extracted as shown in FIG. 10, and the shrink tape is removed as shown in FIG. 11, revealing the bulge B as shown in FIG. 12. The shell is then ready for final finishing, typically by polishing, or painting, or both.

FIGS. 13–16 show three different examples of product components made of thermo-set composites in accordance with the present invention. None of these components could be made using the conventional method, nor could they be fabricated of traditional thermoplastic, the material universally used prior to the present discoveries.

Conventional golf club shafts taper toward the bottom, and the lower end in prior art procedures is inserted into a mating bore in the club head, and glued in place. The prior art club head is normally made of steel castings or forgings and is very strong at the joint between the shaft and head. The golf shaft is somewhat flexible but the shaft is restrained from bending by the portion that is surrounded by the steel head. This creates a "hinge" effect that results in shaft breakage at this point of stress concentration. This point of stress concentration produced a stress zone, highly susceptible to failure compared to the rest of the club. This weakness is a direct result of the limitations imposed by the traditional requirement that the mandrel be removed from the shaft after forming.

Figure 13:
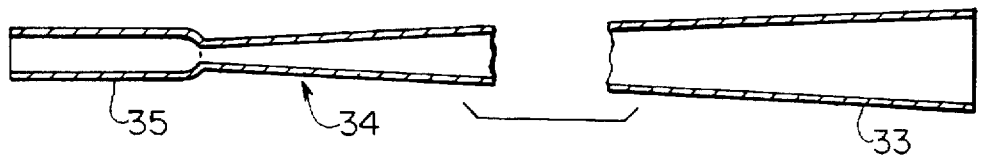
FIG. 13 is a cross sectional view, broken away, of the bottom end of a golf club shaft that has been expanded to produce a golf club head shank-mounting sleeve, as made possible by use of the present invention.
Figure 14:
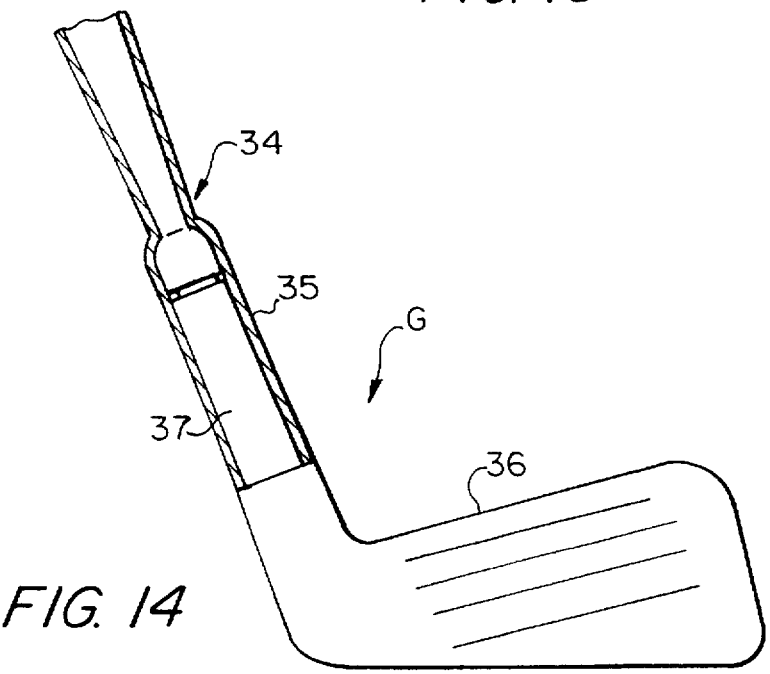
FIG. 14 is a side elevation view in cross-section and partly broken away, of a golf club head and the head shank illustrating the mounting of the head on the shaft.

In contrast, the design of the shaft 34 of FIG. 13 was not so constrained because the present design spreads the load of shaft to head joint more evenly and eliminates shaft failure at the joint. However, prior art methods would not permit the removal of a conventional mandrel from a golf shaft with a flared or expanded upper end 33. The club head 36 as shown in FIG. 14 does not have the typical bore into which a small tapered shaft of the prior art is mounted, but instead the club head has a shank 37 that seats inside the expanded or flared lower end 35 of the shaft. This shaft end 35 can be highly dimensionally accurate as it is molded over a solid core.

The solid core method of FIGS. 17–19 utilizes a tapered mandrel 40 that is of the conventional shape. Split mold 22A is similar to split mold 22 except it has a closed end 22b. Sprue hole 23 receives the low temperature alloy 24. Upon solidification the mold 22A is removed resulting in the mandrel with an expanded lower end 42 formed by the alloy 24. Then the procedures as set forth above and shown in FIGS. 7–11 are followed to wrap the composite cloth 28 on the mandrel 11, overwrap with the shrink tape 30, cure the resin and then drain the alloy by heating to form the finished golf shaft of FIG. 19 having the expanded end 35, the tapered shaft 34 and the tapered or flared upper end 33.

With the golf club G of FIG. 14 the extreme torque formerly opposed by the small moment arm of the tapered shaft end during a stroke, is opposed by the much greater diameter interface between the expanded end 35 and the head 37 shank shown in FIG. 14. Assuming an interface between shaft and club of the present invention that is twice the diameter of the prior art tapered shaft mount, the strength of the shaft-to-head connection would be four times as strong, a major improvement. Additionally, the lower end or sleeve 35 and club head shank 37 need not be circular in cross section. An ovate or rectangular interface would positively resist torsion fractures with an even greater strength multiple.

This strength improvement is an especially important feature for golf clubs. Golf clubs are so sensitive to miniscule variations in center of gravity, sweet spot location and other design criteria, that to substantially free design from the tyranny of strength requirements, enabling virtually all specifications of the club to directed solely toward performance, represents a major advance.

Figure 15:
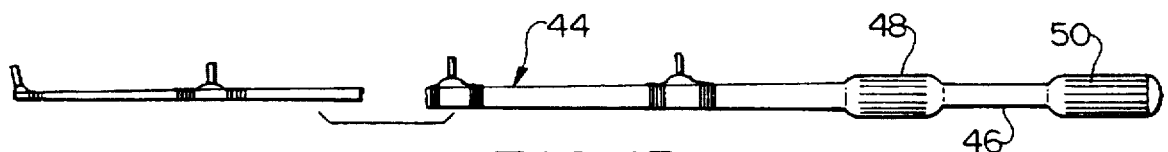
FIG. 15 is a diagrammatic view, partly broken away, of a fishing rod with an integral handle and reel-mounting boss, formed in accordance with the present invention.
Figure 16:
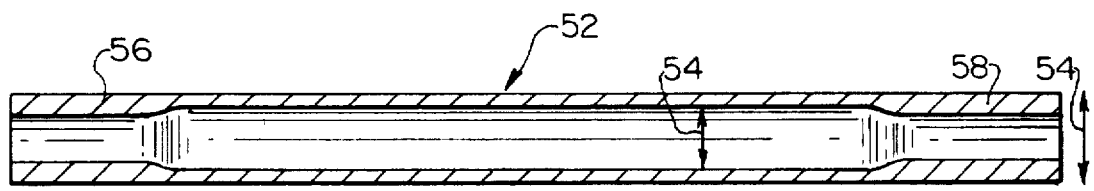
FIG. 16 is a cross-sectional view of a structural tube, such as for a high-performance bicycle frame, wherein the internal diameter is accurately controlled according to required strength, while the outside diameter is maintained uniform.
Figure 20:
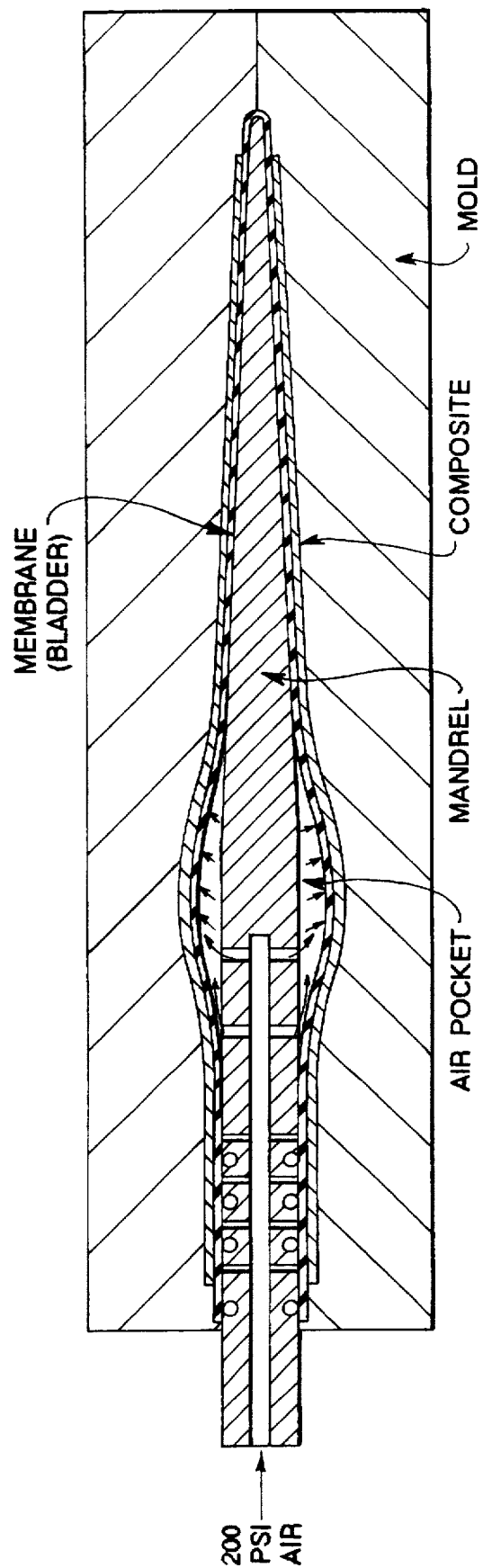
FIG. 20 is a diagrammatic section illustrating the prior art technique used to create bulges in composite tubes with the prior art air-puff method.

Thermoset composite fishing rod handles or hand grips can be made the same way, as shown in FIG. 15. Here, the gradual taper of the composite fishing pole 44 is broken by the expanded reel mounting length 46 that a comfortable forehand grip region 48 and back out to the reel mount diameter at 46 and an after grip 50. With the melting mold technique, the number and complexity of expanded and reduced sections is not critical. Whatever works best for the fisherman can be made. The fisherman no longer pays homage to production expedience.

Another use, and one of perhaps of even more functional significance, is the lightweight structural tube. The most common example of this application is in tubes that make up the frame of a high-performance bicycle. Aside from manpowered flying craft, the pressure to maximize the strength-to-weight ratio in the performance bicycle industry is without equal.

Traditionally, the main body of a frame tube is of the same internal diameter as the ends, with the outside diameter increasing toward the ends to beef up the critical joint region. This generally requires hand-crafting, and produces a frame that suffers aesthetically in accommodation to engineering realities. This is not necessary if the instant fabrication technique is used to produce frame tube 52 as the inside diameter 54 of the frame tube 52 is now independent of the outside diameter 54. Whatever reinforcement is needed, is accomplished, internally, out of sight, as indicated at 56 and 58. The external diameter 54 of the frame tube 52 can be uniform, perfectly cylindrical, with the varying strength requirements along the length of the tube, as well as the mounting end-portions, being configured precisely, mathematically, to engineering specifications.

This technique no doubt has thousands of applications. Any composite tube can be made with the internal surface formed to any configuration, by forming the desired shape as a mold of low-temperature alloy, formed directly on the mandrel. For that matter, the entire core could be made of the low-temperature alloy, without a solid mandrel, so that the entire mass would liquify and evacuate, though the use of the mandrel is generally advantageous.

Whereas the advantage in design flexibility using a solid core rather than an air puff is manifest, the superiority in production efficiency may not be immediately apparent. Speed in production using the disclosed technique results from being able to mold the liquifying metal on the mandrels in a separate production sequence, independent from the making of the shells themselves. The prior clamshell molds must be taken off the last piece and clamped on the next piece, and "puffed" prior to curing. The molds must be left on the piece throughout the curing time. The bulge creation is integrally intertwined with the rolling operation and slows it down dramatically.

The melting mold technique of the present invention, on the other hand, enables the extra bulge-creation effort to be performed prior to rolling the prepreg onto the mandrel and permits high production rates since 500 to 1,000 shells can be cured in a simple oven heat cycle of 1½ to 2 hours. Changes in shapes can be easily accomplished by modifying the small mold that applies the bulge shape to the mandrels.

The existing air puff technique limits the quantity of composite shells that can be produced by the number of cavities in each mold. The uncured shells and mandrels must remain in the clamped molds until they are completely cured.

SPECIFIC EXAMPLE

Product—Composite golf shaft with enlarged section within the shaft as shown in FIG. 12 a) Prepare mandrel

Place mandrel in split mold

Clamp mold halves together

Melt low temperature alloy composed of 60% Bi and 40% Sn

Pour low temperature alloy into mold until alloy appears in pour hole

Optionally—

Eliminate pour hole in mold and pour molten alloy into hole in end of mandrel while mandrel is in vertical position Alloy will cool and solidify in a few minutes as it cools below its melting point.

Unclamp mold and remove mandrel with integrally molded section of alloy.

Cut off the sprue and blend the sprue area into the molded shape.

Apply release agent to mandrel surface. Use paste wax or water soluble commercial release agent.

Warm mandrel to about 110° F. by placing mandrel on heated table.

b) Prepare prepreg patterns

Select prepreg cloth unidirectional carbon fiber—epoxy resin (deglycidylether of bisphenol A) prepreg with an areal weight of 120 to 150 g/m² (12", 24"or 1 meter wide prepreg is available).

Cut prepreg into desired shapes to form a pattern or series of patterns.

c) Attach prepreg cloth to mandrel by hand pressure or use a warm electric iron to "tack" the prepreg to the mandrel.

d) Roll prepreg cloth onto the mandrel.

Place mandrel on commercial rolling table and complete the roll of all the prepreg cloth.

e) Wrap polypropylene shrink tape (1.2 mil×⅝ wide) over prepreg cloth covered mandrel under tension. The tape should be applied in spiral fashion with an overlap of 0.08 to 0.120 between wraps. Tape is applied with a commercial tape wrapping machine.

f) Hang part vertically in oven with the large end down so that the low temperature alloy will drain out of part when melt temperature is reached.

g) Place container under part to retrieve low temperature alloy when it drains from mandrel end.

h) Set oven temperature to 275° F. and cure for two hours. After two hours, the prepreg part will cure completely, but the low temperature alloy will remain a solid.

i) Increase oven temperature to 325° F. for one hour. (The alloy will melt and drain by gravity out of the mandrel/part.

j) Remove part from oven and let cool to handling temperature.

k) Extract mandrel from part using standard mandrel extracting equipment.

l) Remove shrink tape from part by slicing it off with razor knife.

m) Cut part to desired length.

n) Sand exterior surface of part to remove shrink tape marks.

o) Paint part to desired color and finish.

The foregoing example produces a golf shaft in accordance with the present invention.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A method of producing a tubular member having an internal diameter of at least a first magnitude and a region of said member having an internal diameter of a second magnitude comprising, providing an elongated mandrel, having an end and an external surface, surrounding at least a portion of said external surface with a mold having an interior surface diameter greater than the diameter of at least a portion of said external surface of said mandrel, pouring a liquid moldable material capable of setting to a rigid condition into said mold to surround said portion of said external surface of said mandrel, setting said moldable material to form a molded material in the shape of a rigid solid bulge on said at least a portion of said external surface of said mandrel, removing said mold from said mandrel, wrapping said mandrel including said bulge to form at least one lamina of a composite material consisting of a thermosetting resin and reinforcing fibers, covering said composite material with a shrink wrap, curing said thermosetting resin in said composite material by applying heat to said mandrel and said composite material to form said tubular member, removing said molded material from said mandrel, removing said mandrel from said tubular member, and removing said shrink wrap after said curing step whereby said tubular member is produced.

2. The method of claim 1 wherein said moldable material is a low temperature metal alloy including at least one component selected from the group consisting of lead, bismuth, tin, antimony, indium and cadmium.

3. The method of claim 2 wherein the metal alloy melts between about 275° F. –450° F. to effect said molded material removing step.

4. The method of claim 1 wherein the molded material is removable by a solvent.

5. The method of claim 1 wherein said thermosetting resin is curable at a temperature of between 250° F. to 400° F. for a time between 0.25 to 5.0 hours.

6. The method of claim 1 wherein the thermosetting resin is selected from the group consisting of epoxies, phenolics, polyesters, alkyds, amino resins, polyurethanes, phenolfurfurals, cellulose acetates, cellulose nitrates and bismyliamide.

7. The method of claim 1 wherein, said reinforcing fibers are selected from the group consisting of glass, carbon, aramid, boron and polyethylene.

8. The method of claim 1 wherein, said moldable material is a low temperature metal alloy including at least one component selected from the group consisting of lead, bismuth, tin, antimony, indium and cadmium, and said thermosetting resin is curable at a temperature of between 250° F. to 400° F. for a time between 0.25 to 5.0 hours.

9. The method of claim 1 wherein, the thermosetting resin is selected from the group consisting of epoxies, phenolics, polyesters, alkyds, amino resins, polyurethanes, phenolfurfurals, cellulose acetates, cellulose nitrates and bismyliamide, and said thermosetting resin is curable at a temperature of between 250° F. to 400° F. for a time between 0.25 to 5.0 hours.

10. The method of claim 1 wherein, said moldable material is a low temperature metal alloy including at least one component selected from the group consisting of lead, bismuth, tin, antimony, indium and cadmium, the metal alloy melts between about 275° F. –450° F. to effect said molded material removing step, and the thermosetting resin is selected from the group consisting of epoxies, phenolics, polyesters, alkyds, amino resins, polyurethanes, phenolfurfurals, cellulose acetates, cellulose nitrates and bismyliamide.

11. The method of claim 1 wherein, the moldable material is removable by a solvent, and the thermosetting resin is selected from the group consisting of epoxies, phenolics, polyesters, alkyds, amino resins, polyurethanes, phenolfurfurals, cellulose acetates, cellulose nitrates and bismyliamide.

12. The method of claim 1 wherein, said moldable material is a low temperature metal alloy including at least one component selected from the group consisting of lead, bismuth, tin, antimony, indium and cadmium, the metal alloy melts between about 275° F. –450° F. to effect said molded material removing step, the thermosetting resin is selected from the group consisting of epoxies, phenolics, polyesters, alkyds, amino resins, polyurethanes, phenolfurfurals, cellulose acetates, cellulose nitrates and bismyliamide, and said thermosetting resin is curable at a temperature of between 250° F. to 400° F. for a time between 0.25 to 5.0 hours.

13. The method of claim 1 wherein, said moldable material is a low temperature metal alloy including at least one component selected from the group consisting of lead, bismuth, tin, antimony, indium and cadmium, the metal alloy melts between about 275° F. –450° F. to effect said molded material removing step, the thermosetting resin is selected from the group consisting of epoxies, phenolics, polyesters, alkyds, amino resins, polyurethanes, phenolfurfurals, cellulose acetates, cellulose nitrates and bismyliamide, said thermosetting resin is curable at a temperature of between 250° F. to 400° F. for a time between 0.25 to 5.0 hours, and said reinforcing fibers are selected from the group consisting of glass, carbon, aramid, boron and polyethylene.

14. The method of claim 2 wherein, the metal alloy is 40% Bi and 60% Sn.

15. The method of claim 1 wherein, said thermosetting resin is epoxy.

16. The method of claim 2 wherein, the metal alloy is 40% Bi and 60% Sn, and said thermosetting resin is epoxy.

17. The method of claim 1 wherein, the reinforcing fiber is carbon.

18. The method of claim 2 wherein, the metal alloy is 40% Bi and 60% Sn, said thermosetting resin is epoxy, and the reinforcing fiber is carbon.

19. The method of claim 1 wherein, said mandrel is provided with internal passageways communicating between said end and said external surface of said mandrel.

20. The method of claim 1 wherein, said removing said molded material is effected by heating and liquifying said molded material.

21. The method of claim 1 including, said mandrel is provided with internal passageways communicating between said end and said external surface of said mandrel, and liquifying said molded material and removing said molded material by draining said molded material through said passageways and out the end of said mandrel.

22. The method of claim 1 including, liquifying said molded material by heating said molded material to a temperature between about 275° F. –450° F.

23. The method of claim 1 including, liquifying said molded material by treating said molded material with a solvent therefore to remove said molded material.

24. The method of claim 1 including, said mandrel is provided with internal passageways communicating between said end and said external surface of said mandrel, liquifying said molded material and removing said molded material by draining said molded material through said passageways and out the end of said mandrel, and liquifying said molded material by heating said molded material to a temperature between about 275° F. –450° F.

* * * * *